(12) United States Patent
Kajino

(10) Patent No.: US 11,046,212 B2
(45) Date of Patent: Jun. 29, 2021

(54) LIFTING DEVICE

(71) Applicant: TOYOTA BOSHOKU KABUSHIKI KAISHA, Aichi (JP)

(72) Inventor: Yusuke Kajino, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/892,760

(22) Filed: Jun. 4, 2020

(65) Prior Publication Data

US 2020/0391622 A1 Dec. 17, 2020

(30) Foreign Application Priority Data

Jun. 17, 2019 (JP) .............................. JP2019-111875

(51) Int. Cl.
*B60N 2/16* (2006.01)
(52) U.S. Cl.
CPC .................................... *B60N 2/164* (2013.01)
(58) Field of Classification Search
CPC .............................. B60N 2/1615; B60N 2/164
USPC ........................................ 297/344.15, 344.17
See application file for complete search history.

(56) References Cited

U.S. PATENT DOCUMENTS 6,347,778 B1 * 2/2002 Koga ................... B60N 2/1615
248/421
7,984,950 B2 * 7/2011 Hoshi .................. B60N 2/1675
297/344.12

FOREIGN PATENT DOCUMENTS

JP 2001-158260 6/2001

* cited by examiner

*Primary Examiner* — Sara B McPartlin
(74) *Attorney, Agent, or Firm* — Greenblum & Bernstein, P.L.C.

(57) ABSTRACT

A lifting device for raising and lowering a cushion frame of a vehicle seat includes: a lifter link configured to be rotationally displaced to thereby raise or lower the cushion frame; a swing link configured to transmit a force for rotating the lifter link to the lifter link; a screw rod rotatably coupled to the swing link; a driving device configured to displace the screw rod along a first axis; and a first restricting portion configured to restrict displacement of a coupling portion between the swing link and the screw rod beyond a predetermined dimension in a second axis.

4 Claims, 6 Drawing Sheets

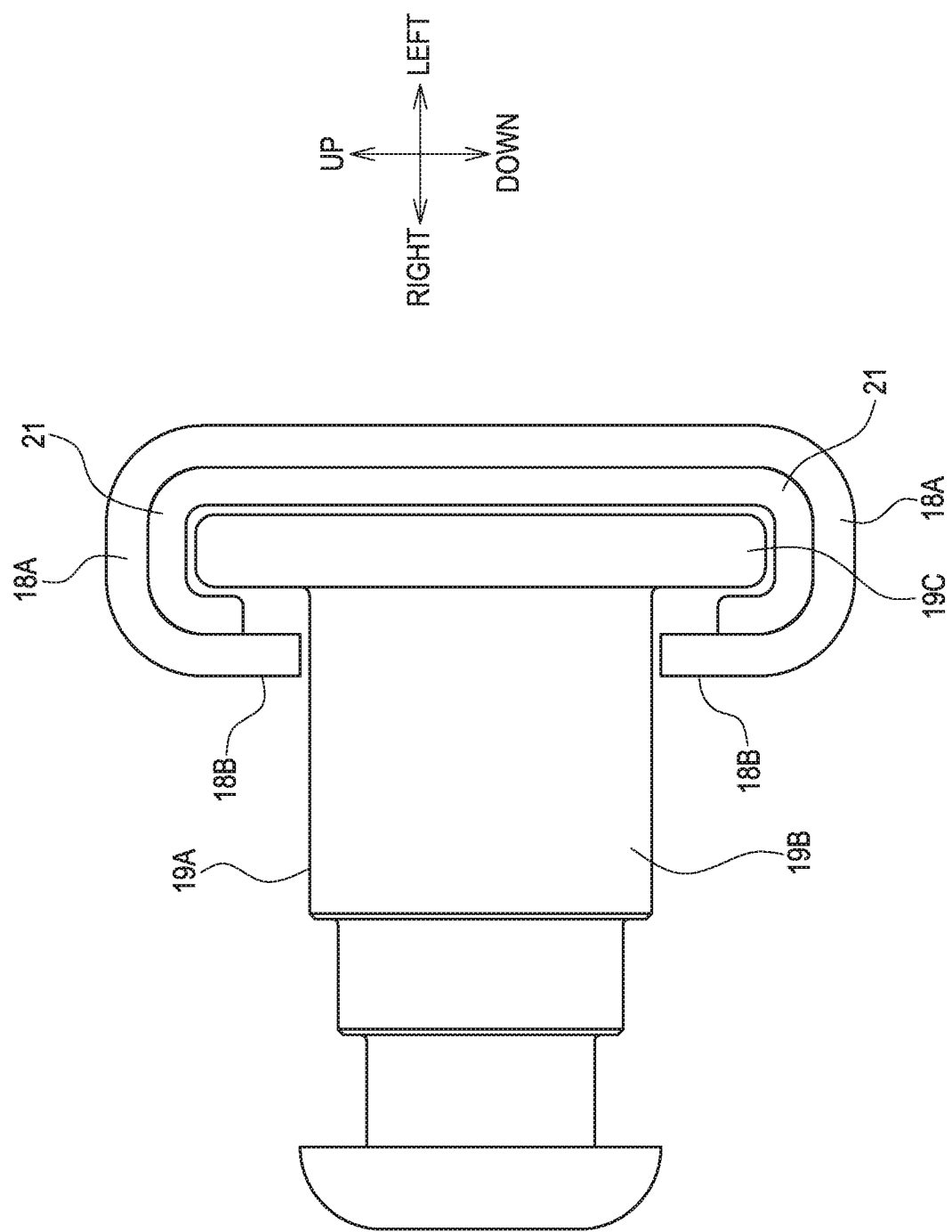

LIFTING DEVICE

CROSS-REFERENCE TO RELATED APPLICATIONS

The present application claims the benefit of Japanese Patent Application No. 2019-111875 filed on Jun. 17, 2019 with the Japan Patent Office, the entire disclosure of which is incorporated herein by reference.

BACKGROUND

The present disclosure relates to a lifting device applied to a vehicle seat.

A lifting device disclosed, for example, in Japanese Unexamined Patent Application Publication No. 2001-158260 (Patent Document 1) comprises a lifter link, a swing link, a screw rod (screw), a driving device, and so on.

The lifter link is a member rotationally displaced to raise or lower a cushion frame (seat cushion). The swing link is a member for transmitting a force for rotating the lifter link to the lifter link.

The screw rod is a member rotatably coupled to the swing link, and has a male screw portion. The driving device rotates a nut screwed to the screw rod, thereby displacing the screw rod. If the driving device is operated, then the screw rod is accordingly displaced in a direction parallel to a longitudinal direction of the screw rod, whereby the lifter link is rotated and the cushion frame is raised or lowered.

SUMMARY

The lifting device according to Patent Document 1 is provided with a locking mechanism in a middle of the swing link in a longitudinal axis. The locking mechanism restricts a large deformation and displacement of the swing link in up-down directions. Therefore, there is a possibility that the screw rod is largely bent and deformed in an arched shape, for example, if a compressive load that can cause buckling of the screw rod and the swing link is applied.

Specifically, in the lifting device according to Patent Document 1, the locking mechanism is provided in the middle of the swing link in the longitudinal axis. Therefore, a portion of the screw rod and the swing link between the driving device and the locking mechanism, that is, a portion constrained by the driving device and the locking mechanism, can be largely bent and deformed in an arched shape. This may lead to an occurrence of a large bending stress in the screw rod and therefore may cause a damage to the screw rod.

The present disclosure discloses examples of a lifting device capable of inhibiting a large damage of a screw rod even if a compressive load that can cause buckling of the screw rod and a swing link is applied.

According to one aspect of the present disclosure, a lifting device configured to raise and lower a cushion frame of a vehicle seat comprises: a lifter link rotatably coupled to the cushion frame and configured to be rotationally displaced to thereby raise or lower the cushion frame; a swing link configured to transmit a force for rotating the lifter link to the lifter link, the swing link having one end portion rotatably coupled to the lifter link; a screw rod rotatably coupled to another end portion of the swing link, the screw rod extending along a first axis approximately perpendicular to a rotational center axis of the lifter link, the screw rod being configured to be displaced along the first axis; a driving device configured to rotate a nut, which is screwed to the screw rod, to thereby displace the screw rod along the first axis; and a first restricting portion configured to restrict displacement of a coupling portion between the swing link and the screw rod beyond a predetermined dimension in a second axis, which is approximately perpendicular to the first axis.

The screw rod of the lifting device thus has a configuration in which the driving device and the coupling portion are constrained. Accordingly, a length (span) of the constrained portion of the lifting device is smaller than a length of the constrained portion disclosed in Patent Document 1. Thus, an amount of bending and deformation of the screw rod is smaller than that of the screw rod disclosed in Patent Document 1 even if a compressive load is applied to the screw rod.

The lifting device may further inhibit a large damage of the screw rod even if a compressive load that can cause buckling of the screw rod and the swing link is applied.

The lifting device may be, for example, configured as described below.

The coupling portion preferably comprises a coupling pin for coupling the swing link to the screw rod, and the first restricting portion preferably restricts displacement of the coupling pin beyond the predetermined dimension in the second axis. This can simplify a configuration for constraining the coupling portion.

It is preferable that there is an elastically deformable buffer arranged between the first restricting portion and the coupling pin. Such a configuration may inhibit direct contact between the first restricting portion and the coupling pin even when the vehicle seat vibrates, and generation of abnormal noises due to the contact may be inhibited.

It is preferable that there is provided a second restricting portion configured to restrict displacement of the coupling portion beyond a given dimension in the second axis, the second restricting portion being arranged at a position, which is offset from the first restricting portion in a direction parallel to an axial direction of the coupling pin. Preferably, the second restricting portion is configured to come into contact with the coupling pin to thereby restrict displacement of the coupling pin when the buffer is deformed beyond a certain dimension, and is spaced apart from the coupling pin when deformation of the buffer is less than the certain dimension.

This configuration allows the first restricting portion and the second restricting portion to restrict displacement of the coupling portion when a large compressive load is applied. Thus, a large flexural deformation of the screw rod can be inhibited even when a large load is applied.

While no load is applied, the second restricting portion and the coupling pin are not in contact with each other. In principle, there is no generation of abnormal noise due to direct contact between the second restricting portion and the coupling pin in this state.

The second restricting portion is preferably provided with at least one indentation, to which a part of the coupling pin can be fitted, the indentation being indented in the second axis.

With this configuration, when a large load is applied and the coupling pin thus comes into contact with the second restricting portion, the part of the coupling pin is fitted into the indentation. This accordingly restrains movement of the coupling pin in the first axis due to the load.

BRIEF DESCRIPTION OF THE DRAWINGS

Embodiments of the present disclosure will be described hereinafter by way of example with reference to the accompanying drawings, in which:

FIG. 6 is a view showing a guide member according to a second embodiment.

DETAILED DESCRIPTION OF EXEMPLARY EMBODIMENTS

Figure 1:
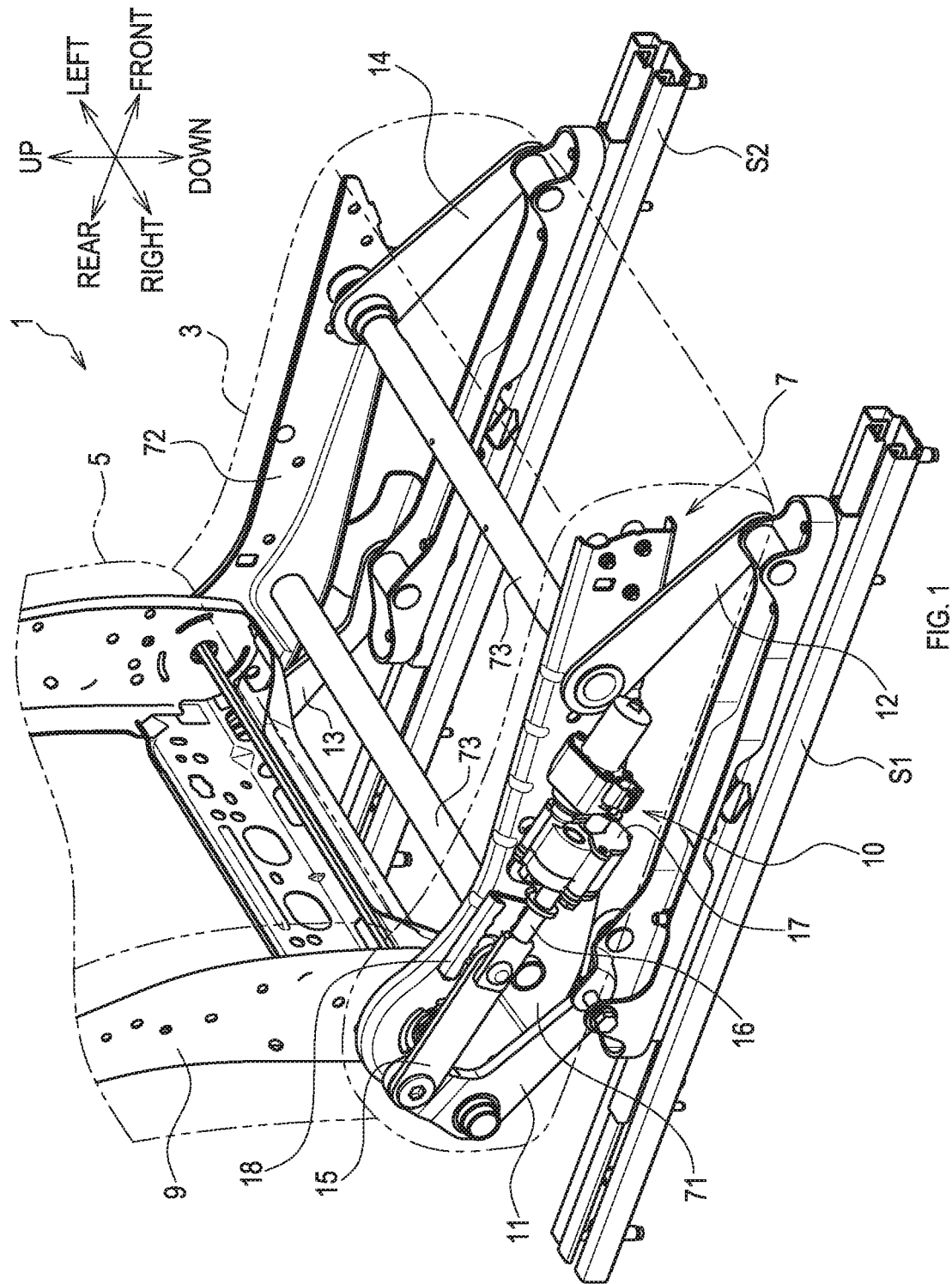
FIG. 1 is a view showing a vehicle seat according to a first embodiment.

Embodiments explained hereinafter show examples of embodiments that belong to the technical scope of the present disclosure. Matters to specify the invention recited in the claims are not limited to specific configurations or structures shown in the embodiments explained hereinafter.

Each of the present embodiments is an example in which a lifting device according to the present disclosure is applied to a seat (hereinafter, referred to as a "vehicle seat") mounted on a vehicle such as an automobile. Arrows indicating directions on each drawing are made for easy understanding of relationships among drawings and shapes of the members or parts.

Thus, the lifting device is not limited by the directions shown in the drawings. The directions labelled on each drawing are directions in a state in which the vehicle seat according to each of the present embodiments is assembled to a vehicle.

The number of each member or part described below is not limited to one but may be two or more.

First Embodiment

1. Overview of Vehicle Seat

A vehicle seat 1 comprises at least a seat cushion 3, a seat back 5 and a lifting device 10 as shown in FIG. 1. The seat cushion 3 supports the buttocks of an occupant. The seat back 5 supports the back of the occupant.

The lifting device 10 is a device for raising and lowering a cushion frame 7. The cushion frame 7 configures a framework of the seat cushion 3. The cushion frame 7 comprises at least a first cushion side frame 71, a second cushion side frame 72 and a plurality of (two, in the present embodiment) coupling pipes 73.

The first cushion side frame 71 extends along front-rear directions of the vehicle seat 1 (hereinafter, referred to as "seat front-rear directions"). The second cushion side frame 72 is arranged at a position, which is offset from the first cushion side frame 71 in a seat-width axis, and extends along the seat front-rear directions.

The two coupling pipes 73 extend along the seat-width axis and couple the first cushion side frame 71 to the second cushion side frame 72. A back frame 9 configuring the framework of the seat back 5 is rotatably coupled to a rear end side of the cushion frame 7.

2. Lifting Device 2.1 Configuration of Lifting Device

The lifting device 10 according to the present embodiment, as shown in FIG. 1, comprises at least a plurality of (four, in the present embodiment) lifter links 11, 12, 13, 14, a swing link 15, a screw rod 16, a driving device 17 and a guide member 18.

(Lifter Link)

Each of the four lifter links 11 to 14 has an upper end portion rotatably coupled to the cushion frame 7 and a lower end portion rotatably coupled to the vehicle. This configuration allows raising or lowering of the cushion frame 7 as the four lifter links 11 to 14 rotate about the lower end portions.

Each of the upper end portions of the lifter links 11, 12 is rotatably coupled to the first cushion side frame 71. Each of the lower end portions of the lifter links 11, 12 is indirectly coupled to the vehicle via a first sliding device S1.

Each of the upper end portions of the lifter links 13, 14 is rotatably coupled to the second cushion side frame 72. Each of the lower end portions of lifter links 13, 14 is indirectly coupled to the vehicle via a second sliding device S2.

The first sliding device S1 and the second sliding device S2 are provided to slidably support the vehicle seat 1. Each of the two sliding devices S1, S2 comprises a fixed rail fixed to the vehicle, a movable rail, to which the vehicle seat 1 is fixed, and the like.

(Swing Link)

Figure 2:
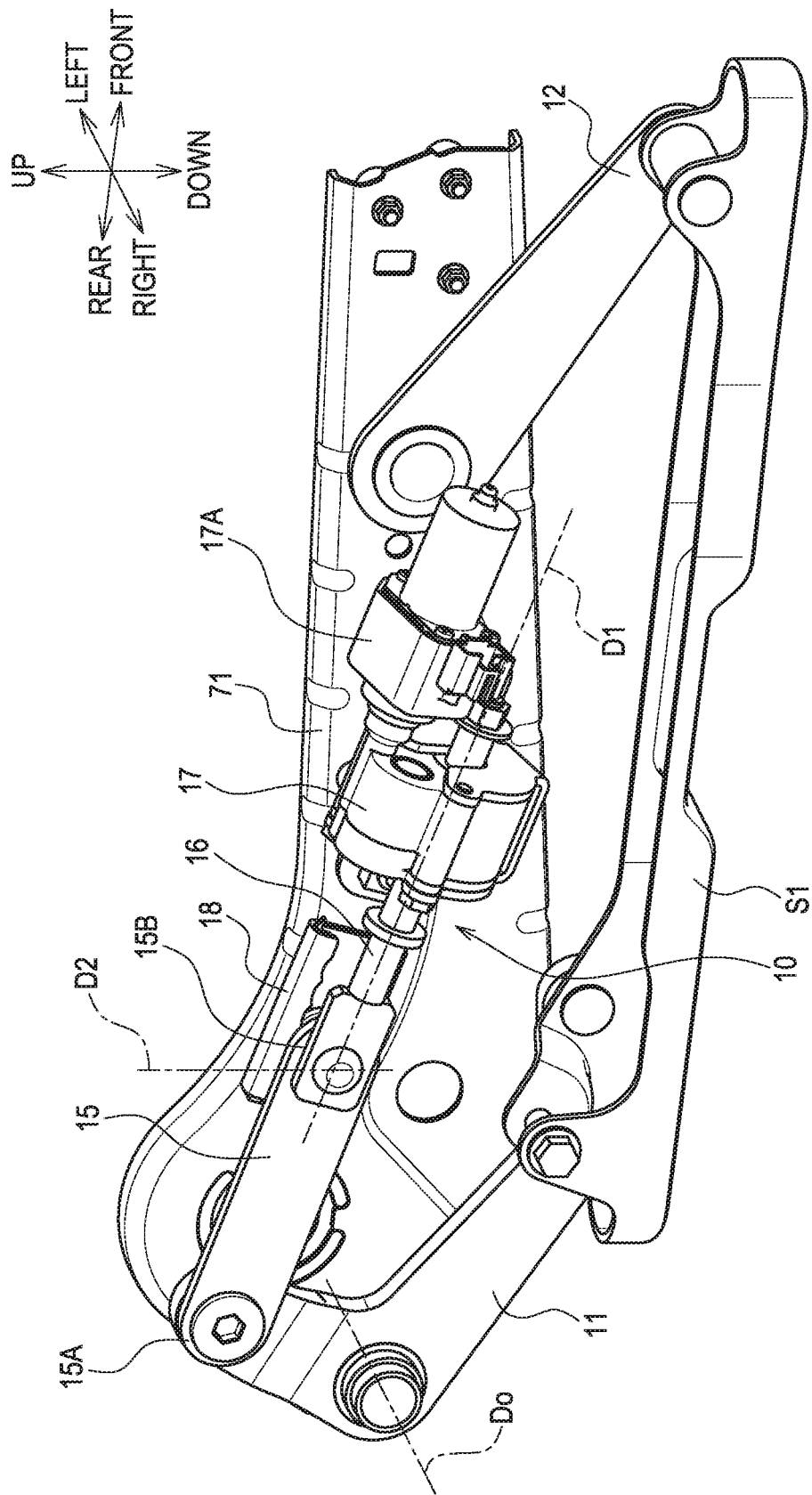
FIG. 2 is a view showing a lifting device according to the first embodiment.

The swing link 15 transmits a force for rotating the lifter link 11 to the lifter link 11. Specifically, as shown in FIG. 2, one end portion 15A of the swing link 15 is rotatably coupled to the lifter link 11. The other end portion 15B of the swing link 15 is rotatably coupled to a leading end portion of the screw rod 16 in an extending axis of the screw rod 16.

A coupling point between the lifter link 11 and the swing link 15 is located at a position, which is offset from a center of a coupling point between the first cushion side frame 71 and the lifter link 11. Thus, when the other end portion 15B of the swing link 15 is displaced in the seat front-rear directions, the lifter link 11 coordinately rotates.

(Screw Rod and Driving Device)

Figure 3:
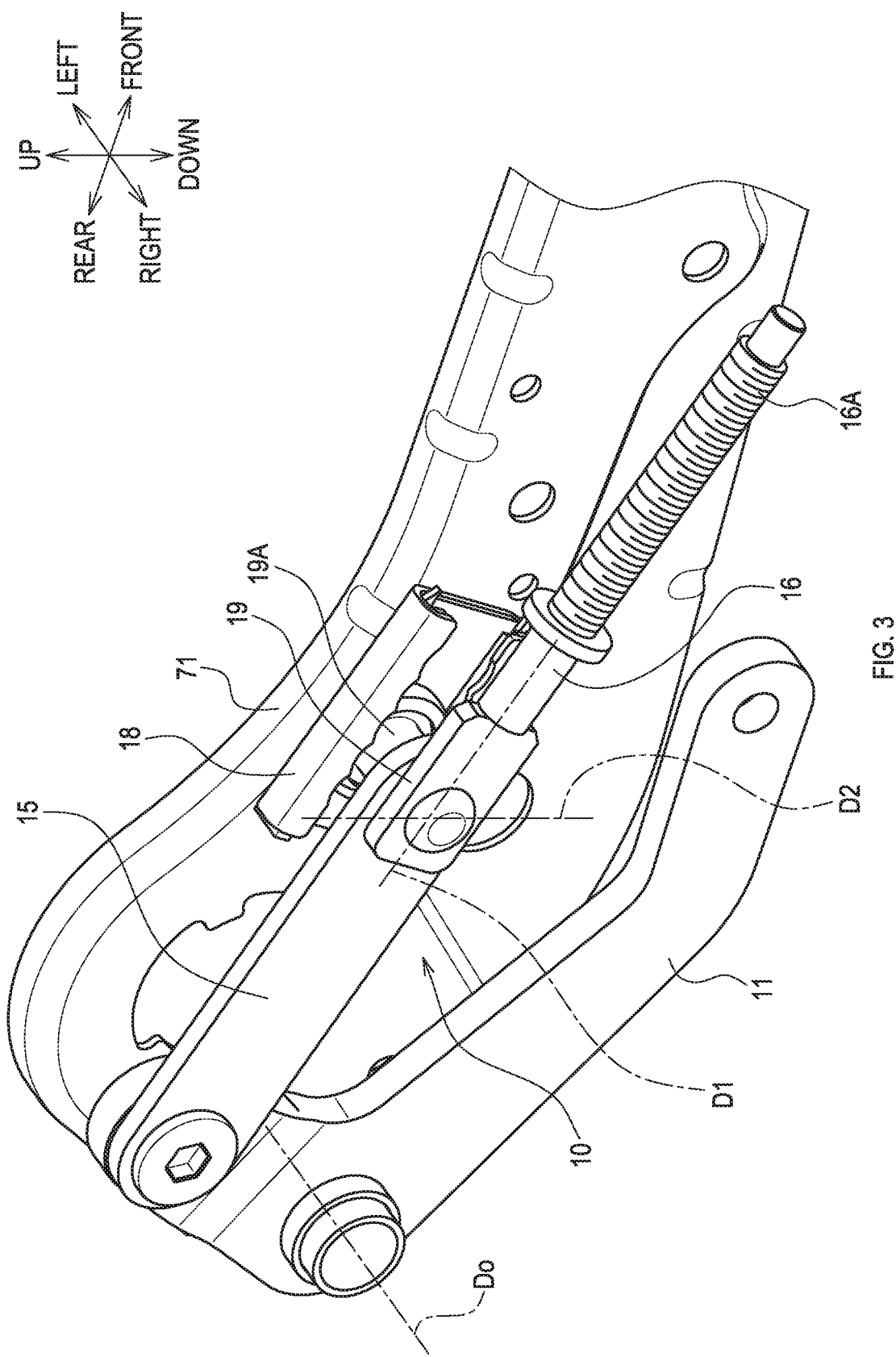
FIG. 3 is another view showing the lifting device according to the first embodiment.

The screw rod 16 is a screw member rotatably coupled to the other end portion 15B of the swing link 15, and including a male screw portion 16A (see FIG. 3). The screw rod 16 extends along an axis (hereinafter, referred to as a first axis D1) substantially perpendicular to a rotational center axis Do of the lifter link 11 and is displaceable in parallel to the first axis D1.

The driving device 17 rotates a nut (not shown), which is screwed to the male screw portion 16A, to thereby displace the screw rod 16 in parallel to the first axis D1. The driving device 17 comprises the aforementioned nut, an electric motor 17A for rotating the nut, and the like.

2.2 Guide Member (Overview of Guide Member)

The guide member 18 guides and restricts displacement of a coupling portion 19 as shown FIG. 3. The coupling portion 19 is a coupling point between the swing link 15 and the screw rod 16. Specifically, the guide member 18 allows displacement of the coupling portion 19 in the first axis D1 and restricts displacement of the coupling portion 19 beyond a predetermined dimension in a second axis D2.

In other words, the swing link 15, the screw rod 16 and the guide member 18 constitute a crank slider mechanism for rotating the lifter link 11. A portion of the lifter link 11 from the rotational center axis Do to the portion coupled with the swing link 15 functions as a crank in the crank slider mechanism.

The second axis D2 is an axis substantially perpendicular to the first axis D1. In the present embodiment, the first axis D1 substantially coincides with the seat front-rear directions, and the second axis D2 substantially coincides with up-down directions. In other words, the second axis D2 is an axis substantially perpendicular to the first axis D1 and the rotational center axis Do.

The coupling portion 19 comprises a coupling pin 19A. The coupling pin 19A couples the swing link 15 to the screw rod 16. The guide member 18 guides and restricts displacement of the coupling pin 19A to thereby guide and restrict the displacement of the coupling portion 19.

(Details of Guide Member)

Figure 4:
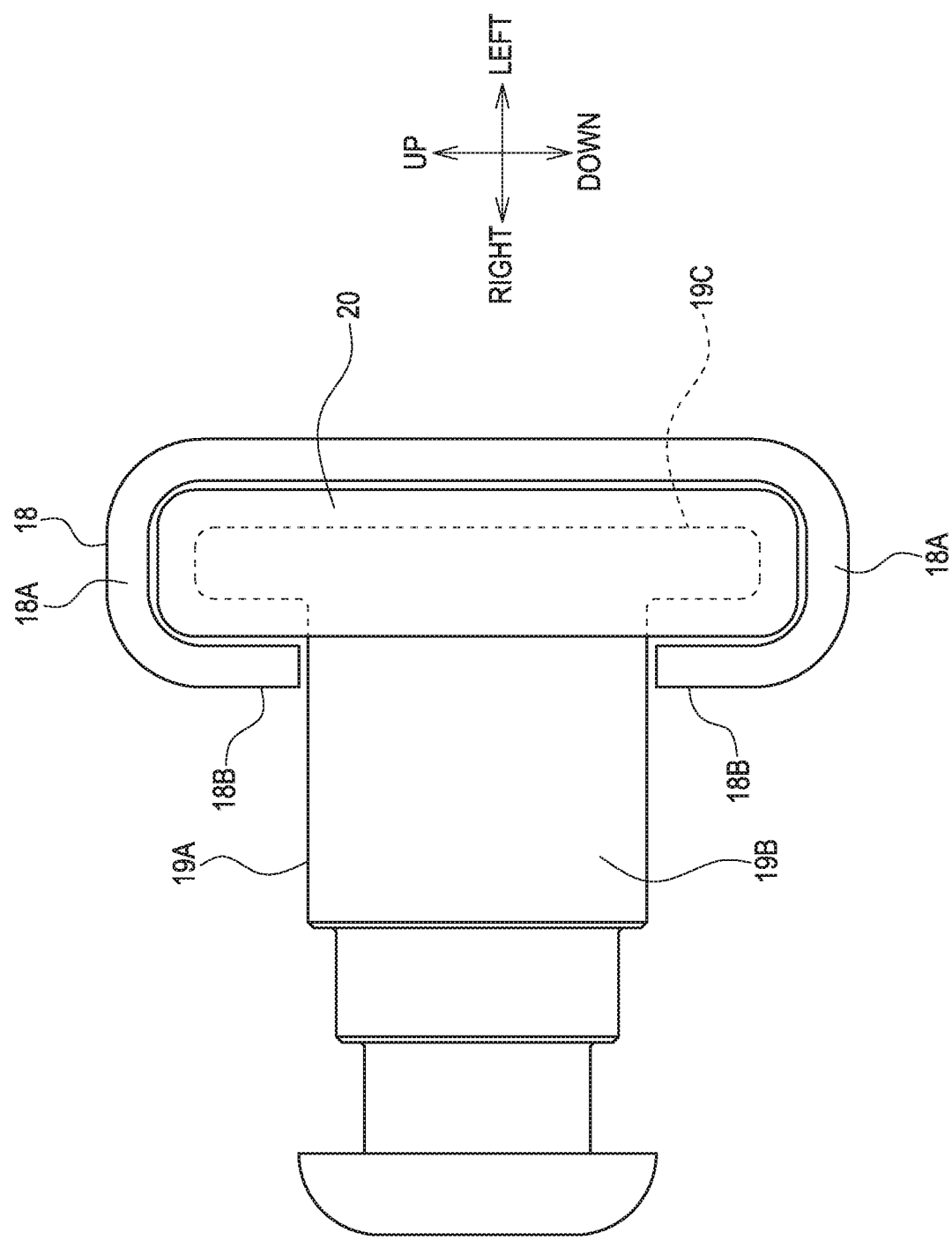
FIG. 4 is a view showing a guide member according to the first embodiment.

The coupling pin 19A comprises at least a pin 19B in the shape of a round bar and a flange 19C, as shown in FIG. 4. The flange 19C is a collar-shaped portion protruding along an entire circumference of an end portion of the pin 19B (at the left end, in FIG. 4). The pin 19B and the flange 19C are integrally formed as a one-piece metal member.

The guide member 18 is a rail member having a substantially C-shaped cross section in such a manner that the guide member 18 covers the flange 19C in the second axis D2 (up-down directions, in FIG. 4). The guide member 18 comprises two first restricting portions 18A and two second restricting portions 18B. The restricting portions 18A, 18B function as components for restricting displacement of the coupling pin 19A in the second axis D2.

(First Restricting Portions)

The two first restricting portions 18A are formed in the shape of walls and face the flange 19C in the second axis D2. The two first restricting portions 18A extend parallel to each other along the first axis D1.

The first restricting portion 18A shown on the upper half of FIG. 4 faces the flange 19C on one side in the second axis D2. The first restricting portion 18A shown on the lower half of FIG. 4 faces the flange 19C on the other side in the second axis D2.

A buffer 20 is arranged between the two first restricting portions 18A and the coupling pin 19A (the flange 19C, in the present embodiment). The buffer 20 is made from an elastically deformable material such as rubber, elastomer, resin and the like. The buffer 20 according to the present embodiment is formed from a cap-shaped member covering the flange 19C.

The buffer 20 and the two first restricting portions 18A are in contact with each other with no or little contact surface pressure therebetween or are spaced apart from each other. Therefore, the material of the buffer 20 preferably has a small friction coefficient with respect to a member forming the first restricting portions 18A, which may be a steel plate such as SPCC, in the present embodiment.

(Second Restricting Portion)

The two second restricting portions 18B are provided at positions, which are offset from the two the first restricting portions 18A in a direction parallel to an axial direction of the coupling pin 19A (to a right side, in the present embodiment), as shown in FIG. 4.

Figure 5:
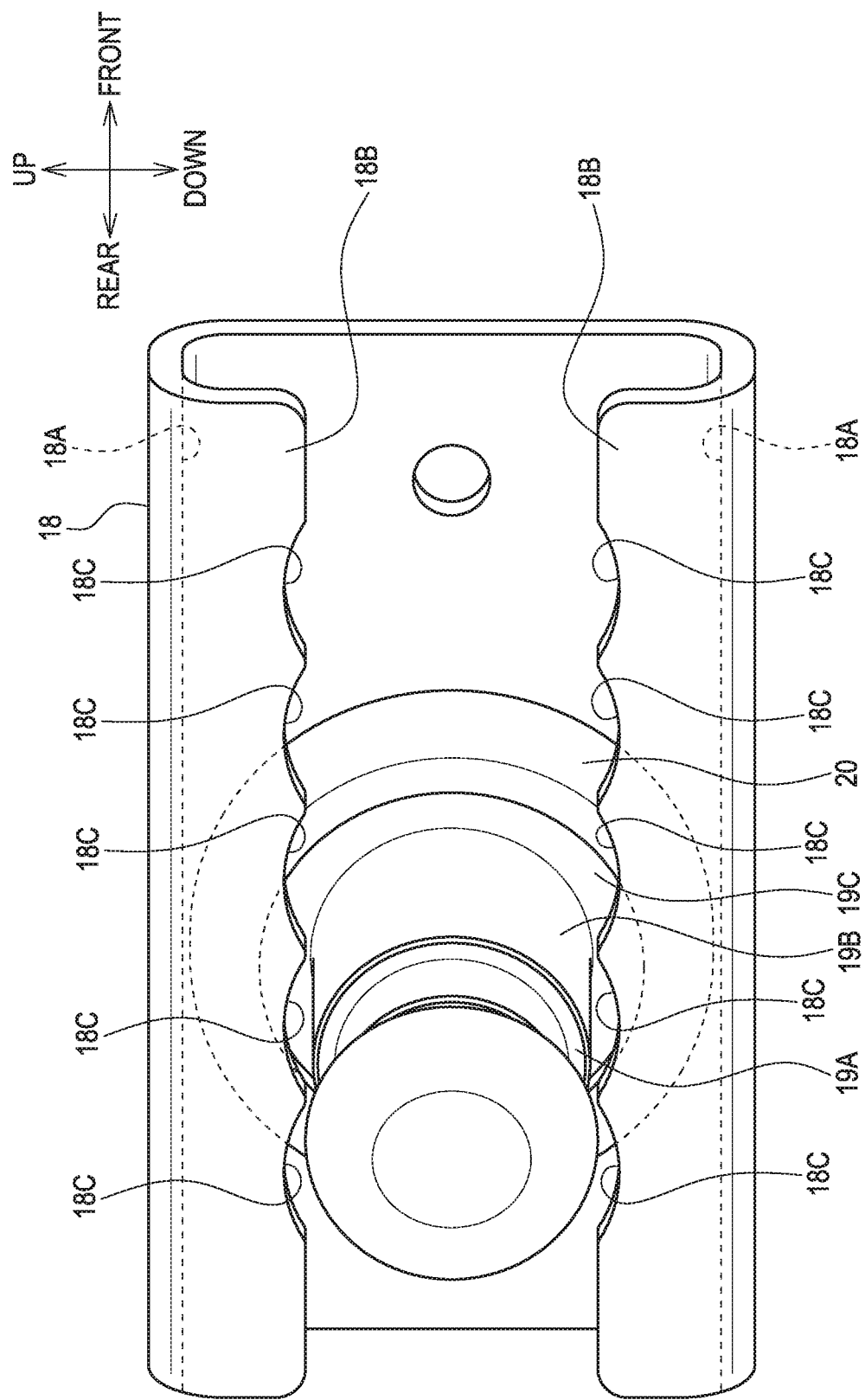
FIG. 5 is another view showing the guide member according to the first embodiment.

The two second restricting portions 18B come into contact with the coupling pin 19A (the pin 19B, in the present embodiment), as shown in FIG. 5, when the buffer 20 is deformed beyond a certain dimension, thereby restricting a large displacement of the coupling pin 19A in the second axis D2.

Specifically, the two second restricting portions 18B face the pin 19B in the second axis D2. The second restricting portion 18B shown on the upper half of FIG. 5 faces the pin 19B on one side in the second axis D2. The second restricting portion 18B shown on the lower half of FIG. 5 faces the pin 19B on the other side in the second axis D2.

Each of the two second restricting portions 18B is spaced apart from the pin 19B with a clearance therebetween when deformation of the buffer 20 is less than the certain dimension. When the buffer 20 is compressed and largely deformed in such a manner that the buffer 20 is partially crushed, the pin 19B comes into contact with one of the two second restricting portions 18B.

Each of the two second restricting portions 18B according to the present embodiment is provided with a series of indentations 18C and is formed in a waved shape. Each indentation 18C can be fitted with a part of the coupling pin 19A and is indented in the second axis.

3. Features of Lifting Device According to the Present Embodiment

The lifting device 10 according to the present embodiment comprises the first restricting portions 18A for restricting displacement of the coupling portion 19 between the swing link 15 and the screw rod 16 beyond the predetermined dimension in the second axis D2.

Thus, the screw rod 16 in the lifting device 10 has a configuration, in which the driving device 17 and the coupling portion 19 are constrained. Accordingly, in the lifting device 10, the length of the constrained portion is smaller than that in Patent Document 1. Thus, an amount of bending and deformation of the screw rod 16 is smaller than that of the screw rod according to Patent Document 1 even if a compressive load is applied to the screw rod 16.

This further may inhibit a large damage of the screw rod 16 in the lifting device 10 even if a compressive load that can cause buckling of the screw rod 16 and the swing link 15 is applied.

The coupling portion 19 comprises the coupling pin 19A for coupling the swing link 15 and the screw rod 16. The first restricting portions 18A restrict displacement of the coupling pin 19A beyond the predetermined dimension in the second axis D2. This can simplify a configuration for constraining the coupling portion 19.

The elastically deformable buffer 20 is arranged between the first restricting portions 18A and the coupling pin 19A. This restrains direct contact between the first restricting portions 18A and the coupling pin 19A even when the vehicle seat 1 vibrates, whereby generation of abnormal noises due to the contact may be inhibited.

The second restricting portions 18B are provided at the positions, which are offset from the first restricting portions 18A in the direction parallel to the axial direction of the coupling pin 19A. The second restricting portion 18B comes into contact with the coupling pin 19A when the buffer 20 is deformed beyond the certain dimension, thereby restricting a large displacement of the coupling pin 19A in the second axis D2.

This configuration allows the first restricting portion 18A and the second restricting portion 18B to restrict displacement of the coupling portion 19 when a large compressive load is applied. Thus, large bending and deformation of the screw rod 16 may be inhibited even when a large load is applied.

Each of the second restricting portions 18B is spaced apart from the coupling pin 19A with a clearance therebetween when deformation of the buffer 20 is less than the certain dimension. Thus, while no load is applied, the second restricting portions 18B and the coupling pin 19A are not in contact with each other. In principle, there is no generation of abnormal noise due to direct contact between the second restricting portions 18B and the coupling pin 19A in this state.

The second restricting portion 18B is provided with the series of indentations 18C, which can be fitted with a part of the coupling pin 19A and are indented in the second axis D2.

Accordingly, when a large load is applied and the coupling pin 19A thus comes into contact with the second restricting portion 18B, a part of the coupling pin 19A is fitted into any one of the series of indentations 18C. Thus, a movement of the coupling pin 19A in the first axis due to the load may be inhibited.

Second Embodiment

The buffer 20 according to the above-described embodiment is a cap-shaped member that can be fitted to the flange 19C of the coupling pin 19A. Differently from this, a buffer 21 according to the present embodiment is installed to inner walls of the first restricting portions 18A, as shown in FIG. 6.

Specifically, the buffer 21 is a rail-like member having a substantially C-shaped cross section in such a manner that the buffer 21 covers the flange 19C in the second axis D2 (up-down directions, in FIG. 6). In other words, the buffer 21 according to the present embodiment is formed to have a shape substantially similar to the guide member 18, installed inside the guide member 18, and made from an elastically deformable material such as rubber, elastomer, resin and the like.

The same components as those in the first embodiment are denoted by the same reference numerals as in the first embodiment. Therefore, repetitive description is not given in the present embodiment.

Other Embodiments

The guide member 18 according to each of the above-described embodiments is provided with the second restricting portions 18B. However, the present disclosure is not limited to this. Specifically, the present disclosure may employ, for example, a guide member 18 in which the second restricting portions 18B are not provided.

The guide member 18 according to each of the above-described embodiments is provided with the first restricting portions 18A and the second restricting portions 18B on both of the one side and the other side with respect to the second axis D2. However, the present disclosure is not limited to this. Specifically, the present disclosure may have a configuration, for example, in which the first restricting portion 18A or the second restricting portion 18B is provided only on either the one side or the other side with respect to the second axis D2.

The second restricting portion 18B according to each of the above-described embodiments is provided with the series of indentations 18C. However, the present disclosure is not limited to this. Specifically, the present disclosure may employ, for example, the second restricting portion 18B in which the indentations 18C are not provided.

The lifting device 10 according to each of the above-described embodiments comprises the buffer 20 or 21 between the first restricting portions 18A and the coupling pin 19A. However, the present disclosure is not limited to this. Specifically, the present disclosure may have a configuration, for example, in which the buffers 20, 21 are not provided.

In each of the above-described embodiments, the second restricting portions 18B and the coupling pin 19A are not in contact with each other while no load is applied. However, the present disclosure is not limited to this. Specifically, the present disclosure may have a configuration, for example, in which each of the second restricting portions 18B and the coupling pin 19A are in contact with each other with no or little contact surface pressure therebetween while no load is applied.

The lifting device 10 according to each of the above-described embodiments is arranged at the first cushion side frame 71. However, the present disclosure is not limited to this. Specifically, the present disclosure may have a configuration, for example, in which the second cushion side frame 72 is provided, with the lifting device 10.

In the above-described embodiments, a vehicle seat according to the present disclosure is applied to an automobile. However, the application of the present disclosure is not limited only to this and the present disclosure may be also applied to seats for vehicles, such as railroad vehicles, ships and boats and aircrafts, and to stationary seats used in theaters or for household use.

Furthermore, the present disclosure may be embodied in various forms within the purpose of the invention described in the claims, and the present disclosure is not limited to the aforementioned embodiments. Accordingly, it may be possible to employ a configuration obtained by combining at least two embodiments among the aforementioned embodiments, or a configuration obtained by removing a constituent feature or constituent features of the invention described in the embodiments.

What is claimed is:

1. A lifting device for raising and lowering a cushion frame of a vehicle seat, comprising:
    a lifter link rotatably coupled to the cushion frame, the lifter link being configured to be rotationally displaced to thereby raise or lower the cushion frame;
    a swing link configured to transmit a force for rotating the lifter link to the lifter link, the swing link having one end portion rotatably coupled to the lifter link;
    a screw rod rotatably coupled to another end portion of the swing link, the screw rod extending along a first axis approximately perpendicular to a rotational center axis of the lifter link, and being displaced along the first axis;
    a driving device configured to rotate a nut, which is screwed to the screw rod, to thereby displace the screw rod along the first axis; and
    a first restricting portion configured to restrict displacement of a coupling portion between the swing link and the screw rod beyond a predetermined dimension in a second axis, which is approximately perpendicular to the first axis,
    wherein the coupling portion comprises a coupling pin for coupling the swing link and the screw rod, and wherein the first restricting portion is configured to restrict displacement of the coupling pin beyond the predetermined dimension in the second axis.

2. The lifting device according to claim 1, further comprising:
    an elastically deformable buffer arranged between the first restricting portion and the coupling pin.

3. The lifting device according to claim 2, further comprising:
    a second restricting portion configured to restrict displacement of the coupling portion beyond a given dimension in the second axis, the second restricting portion being provided at a position, which is offset from the first restricting portion in a direction parallel to an axial direction of the coupling pin,
    wherein the second restricting portion is configured to come into contact with the coupling pin to thereby restrict displacement of the coupling pin when the buffer is deformed beyond a certain dimension, and wherein the second restricting portion is further configured to be spaced apart from the coupling pin when deformation of the buffer is less than the certain dimension.

4. The lifting device according to claim 3, wherein the second restricting portion is provided with at least one indentation, to which a part of the coupling pin can be fitted, the indentation being indented in the second axis.

* * * * *